United States Patent

Ikuta et al.

[11] Patent Number: 6,005,749
[45] Date of Patent: Dec. 21, 1999

[54] ROTATION DRIVE APPARATUS

[75] Inventors: Hiroshi Ikuta; Fumiharu Sudo; Toru Nakahara; Mitsuhiro Ueno, all of Chiba; Yuji Shishido, Kanagawa, all of Japan

[73] Assignee: Sony Corporation, Japan

[21] Appl. No.: 09/035,845

[22] Filed: Mar. 6, 1998

[30] Foreign Application Priority Data

Mar. 7, 1997 [JP] Japan ................................. P09-053705
Jul. 23, 1997 [JP] Japan ................................. P09-196817

[51] Int. Cl.$^6$ ............................. G11B 17/02; H02K 5/24
[52] U.S. Cl. ........................................ 360/99.12; 310/51
[58] Field of Search ............................. 360/97.02, 98.07, 360/98.08, 99.04, 99.08, 99.12; 369/258, 263, 266, 268, 269; 310/51, 67 R, 90; 74/572, 573 R, 574

[56] References Cited

U.S. PATENT DOCUMENTS

| | | | |
|---|---|---|---|
| 3,109,321 | 11/1963 | Rogers | 74/573 R |
| 3,282,127 | 11/1966 | Deakin | 74/573 R |
| 3,733,923 | 5/1973 | Goodrich et al. | 74/573 R |
| 3,854,347 | 12/1974 | Hellerich | 74/573 R |
| 4,653,169 | 3/1987 | Puszakowski | 156/304.2 |
| 4,674,356 | 6/1987 | Kilgore | 74/573 R |
| 5,256,037 | 10/1993 | Chatelain | 417/423.7 |
| 5,391,952 | 2/1995 | Simazu et al. | 310/67 R |

*Primary Examiner*—John H. Wolff
*Assistant Examiner*—Angel Castro
*Attorney, Agent, or Firm*—Rader, Fishman & Grauer; Ronald P. Kananen

[57] ABSTRACT

A magnet is provided which holds spherical balancers in the central portion of a rotor when the rotation of the rotor is stopped. When rotations of the rotor is started, a larger torque $T_0$ is transmitted from the rotor to the balancers. Thus, the balancers quickly start rotating. When the rotor rotates at high speed, the centrifugal force separates the balancers from the magnet and moves the same to the outer wall portion of the rotor. At this time, a torque $T_0$ which is transmitted from the rotor to the balancer is reduced so that the balancers are moved in the circumferential direction. Thus, the automatic aligning operation is performed. The number (n) of the balancers is made to be a value obtained by the following equation:

$n=180/\theta+0.5$ (all digits to the right of the decimal point are discarded)

wherein θ: angle of balancer balls disposed in the outer portion, in which $\theta=2\sin^{-1}\{r/(R-r)\}$
  R: radius of movable space
  r: radius of each balancer ball

10 Claims, 17 Drawing Sheets

ROTATION DRIVE APPARATUS

BACKGROUND OF THE INVENTION

1. Field of the Invention

The present invention relates to a technical field of rotation drive apparatuses, and more particularly to a technique for preventing vibrations which are created when a composite rotor which is imbalanced in terms of weight is rotated and reducing the thickness of an automatic aligning mechanism.

2. Prior Art

A main portion of industrial machines, home electronic products and computers has a rotative member which is rotated by a motor or the like. For example, a disc drive unit (a rotating mechanism) is structured in such a manner that an optical pickup unit or a magnetic head unit records and/or reproduces an information signal while an optical disc or a magneto-optical disc, which is a signal recording medium, is rotated. The optical disc, which is adapted to the disc drive unit of the foregoing type and which is rotated by the disc rotation drive apparatus, is included as a portion of the composite rotor.

The disc drive unit has an optical pickup unit for irradiating an optical disc, which is rotated by the disc rotation drive apparatus, with a laser beam. The disc rotation drive apparatus has a disc table on which an optical disc is mounted and a spindle motor for rotating the disc table.

The optical pickup unit has a light source for irradiating the optical disc with a laser beam and a photodetector for receiving the laser beam reflected by the signal recording surface of the optical disc. The optical pickup unit and the disc rotation drive apparatus are mounted on, for example, a sub-chassis. The sub-chassis supports the optical pickup unit in such a manner that the optical pickup unit is able to move in directions in which the optical pickup unit is brought into contact with the disc rotation drive apparatus, which fixedly supports the sub-chassis, and the same is moved away from the disc rotation drive apparatus.

The disc drive unit having the above-mentioned structure is arranged in such a manner that the optical disc, which is rotated by the spindle motor, is irradiated with a laser beam emitted from the optical pickup unit to record and/or reproduce an information signal.

The recording disc, such as the optical disc, sometimes encounters a weight imbalance when the recording disc is manufactured. If a recording disc having the weight imbalance is rotated, the center of rotation and the center of gravity do not coincide with each other. In this case, the recording disc is vibrated together with the disc table. If vibrations of the foregoing type are created, focusing and tracking with respect to the signal recording surface of the recording disc which are performed by the optical pickup unit become unsatisfactory. What is worse, the magnetic head apparatus cannot satisfactorily follow the recording disc.

The amount of the created imbalance of the recording disc varies depending on the recording disc. If the thickness or the density of the substrate of the recording disc is nonuniform, the center of gravity of the recording disc is not positioned at the center of the recording disc. As a result, each recording disc encounters imbalance in terms of the weight. For example, the CD-ROM (Compact Disc Read Only Memory) is permitted to have an amount of imbalance of 1 g.cm in accordance with the regulated standard therefor.

Recently, data has been recorded on the recording disc or reproduced from the same at high speed. Since the rotational speed has been raised, there arises a problem in that the composite rotor (including the recording disc) is vibrated excessively.

Therefore, the inventor of the present invention has suggested a rotation control apparatus which has a balancing member disposed rotatively with respect to the disc table. During rotations of the disc table, the balancing member of the rotation control apparatus is moved to a position at which the imbalance of the recording disc is suspended so that the balance is kept. As a result, the recording disc, the disc table and the balancing member are brought to a state in which the center of gravity and the center of rotation coincide with each other. As a result, vibration is not created so that the recording disc is consistantly rotated at high speed.

The rotation control apparatus having the foregoing balancing member must be structured in such a manner that the operation for making the center of gravity of the overall body including the composite rotor consisting of the recording disc and the disc table and the rotation center to coincide with each other, that is, the aligning operation can effectively be performed. To enable this, the relative movement of the balancing member with respect to the rotor must be performed smoothly. That is, frictional force generated between the balancing member and the rotor when the balancing member is rotated with respect to the rotor must be reduced to a minimum.

If the frictional force generated between the balancing member and the rotor is reduced, the balancing member separates from the rotor when the stopped rotor starts rotating. Thus, the balancing member cannot start rotating together with the rotor. The aligning operation is performed when the balancing member synchronizes with the rotor and rotates at the same speed as that of the rotor. Therefore, the balancing member must start rotating when the rotor starts rotating to cause the aligning operation to quickly be performed. If the balancing member is brought to a position at which it generates imbalance when the rotor stops moving, there is apprehension that large vibrations may occur in a period between the start of rotation of the rotor and the execution of the aligning operation.

SUMMARY OF THE INVENTION

In view of the foregoing, an object of the present invention is to provide a rotation control apparatus having a balancing member disposed to be movable with respect to a rotor so as to cancel imbalance of the rotor and capable of causing the balancing member to quickly follow rotations of the rotor after the rotor has started rotating and satisfactorily performing an aligning operation by movement of the balancing member with respect to the rotor.

An automatic aligning apparatus according to the present invention consists of a base, balancing members and magnetic field generating means to be capable of automatically positioning the center of gravity of a rotor on a rotational axis during the rotations of the rotor. Therefore, when the halt rotor starts rotating, the balancing members follow the rotor and quickly start rotating together with the rotor. When the rotor is being rotated, the balancing members are moved with respect to the rotor. Thus, a satisfactory aligning operation can be performed.

Each of the balancing members is formed into a spherical shape and the number (n) of the balancing member is made to be a number which can be calculated by the following equation:

$n = 180/\theta + 0.5$ (all digits to the right of the decimal point are discarded)

wherein θ: angle of balancer balls disposed in the outer portion, in which θ=2sin$^{-1}$ {r/(R−r)}

R: radius of movable space r: radius of each balancer ball

Therefore, the number of the balancer balls in a movable space can be optimized, that is, an automatic aligning apparatus having optimum equilibrium performance (an aligning effect) can be obtained if the same-size balancer balls are employed. As a result, the size of each of the balancer balls for canceling a predetermined amount of imbalance can be minimized. As a result, the thickness of the automatic aligning apparatus can be reduced.

Other objects, features and advantages of the invention will be evident from the following detailed description of the preferred embodiments described in conjunction with the attached drawings.

PREFERRED EMBODIMENTS OF THE INVENTION

Embodiments of the present invention will now be described with reference to the drawings. This embodiment has a structure where a rotation control apparatus according to the present invention holds the central portion of a disc-like recording medium (that is, a recording disc), such as an optical disc or a magneto-optical disc, to rotate the recording disc.

Figure 1:
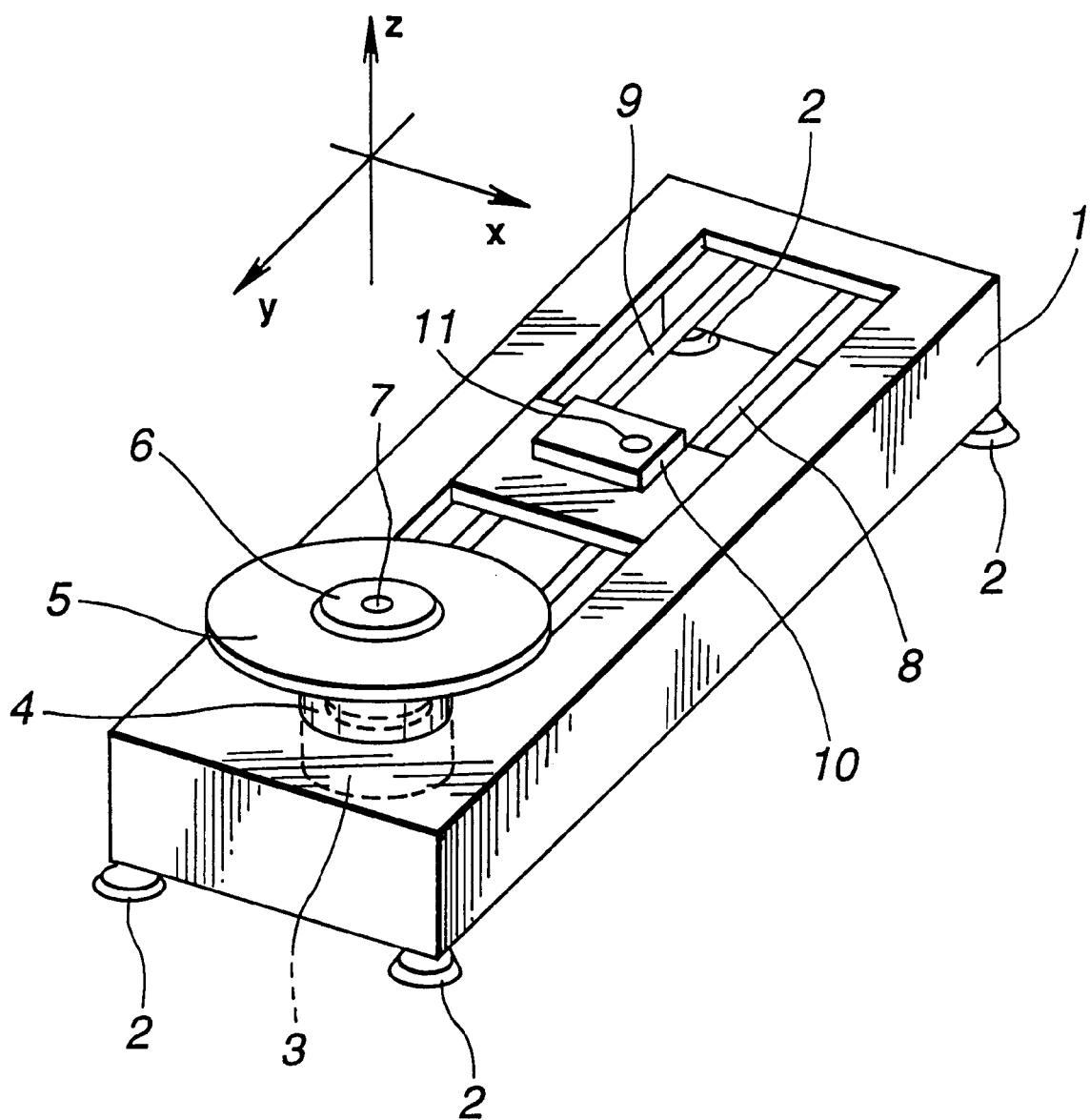
FIG. 1 is a perspective view showing a configuration of a disc drive apparatus provided with a disc rotation control apparatus employing the rotation drive apparatus according to the present invention.

As shown in FIG. 1, the disc rotation control apparatus is applied to a disc drive unit which has an optical pickup unit 10 for irradiating a recording disc, which is rotated, with a laser beam. The disc drive unit forms a portion of a disc player apparatus for reading data from the recording disc or writing the same on the recording disc.

The recording disc is composed of a transparent substrate made of, for example, synthetic resin, such as polycarbonate, and formed into a disc-like shape having a diameter of 120 mm, the transparent substrate having a signal recording surface. The recording disc has a circular opening (a chucking hole) in the central portion thereof. The recording disc is located with respect to the disc rotation control apparatus when a locating member of a disc table (to be described later) of the disc rotation control apparatus is inserted into the circular opening.

The disc drive unit, as shown in FIG. 1, includes a mechanical chassis 1 serving as a mount portion on which a spindle motor 3 and an optical pickup unit 10 serving as drive means for constituting the disc rotation control apparatus are mounted. Moreover, the disc drive unit has a plurality of dampers 2 disposed between the mechanical chassis 1 and an outer case of a body (not shown) of the disc rotation control apparatus so as to support the mechanical chassis 1 in a floating manner.

The optical pickup unit 10 is slidably supported by the mechanical chassis 1 through guide shafts 8 and 9. The optical pickup unit 10 has a light source, such as a laser diode, so that the recording disc is irradiated with a light beam emitted from the light source through an objective lens 11. Moreover, the optical pickup unit 10 detects light of the laser beam reflected by the recording disc.

Figure 2:
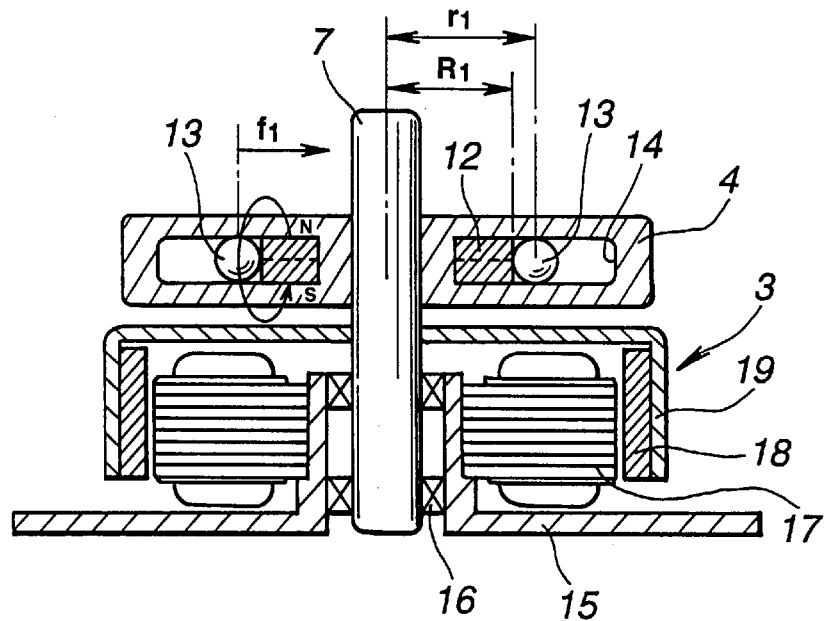
FIG. 2 is a horizontal cross-sectional view showing a configuration of an essential portion of the aforementioned disc rotation control apparatus.

The disc rotation control apparatus has a support shaft (a spindle shaft) 7 rotatively supported on the mechanical chassis 1 and rotated by a spindle motor 3. Moreover, the disc rotation control apparatus has a case 4 and a disc table (turn table) 5 joined to the support shaft 7. As shown in FIG. 2, the support shaft 7 is, through a bearing 16, supported rotatively with respect to a motor board 15 secured to the upper surface of the case 4 and forming a base portion. A motor rotor 19 forming the spindle motor 3 is joined to the support shaft 7. The motor rotor 19 has a cylindrical shape and includes a drive magnet 18 joined to the inner surface thereof. The drive magnet 18 is disposed opposite to a stator coil 17 secured to the upper surface of the motor board 15. When an electric current for operation is supplied to the stator coil 17, a magnetic field generated by the stator coil 17 acts on the drive magnet 18. Thus, the drive magnet 18 and the motor rotor 19 are rotated together with the support shaft 7. That is, the support shaft 7 serves as a drive shaft for the spindle motor 3.

The disc table 5 is joined to the leading end of the support shaft 7. The disc table 5 formed into a disc-like shape has an insertion hole formed in the central portion thereof to receive the support shaft 7. Since the leading end of the support shaft 7 is press-fit into the insertion hole of the disc table 5 for receiving the support shaft 7, the disc table 5 is joined to the support shaft 7. The disc table 5 has a locating projection 6 in the central portion thereof, the locating projection 6 being arranged to locate the recording disc. The locating projection 6 is substantially formed into a truncated cone so that the locating projection 6 projects over the central portion of the disc table 5. The locating projection 6 is received in a chucking hole formed in the recording disc so that the recording disc is positioned correctly. A magnet is included in the locating projection 6 so that a chucking member (a clamper) (not shown) made of a magnetic material is attracted to the magnet. Since the locating projection 6 attracts the chucking member, the recording disc is held between the disc table 5 and the chucking member so as to reliably be held at the foregoing position.

Figure 3:
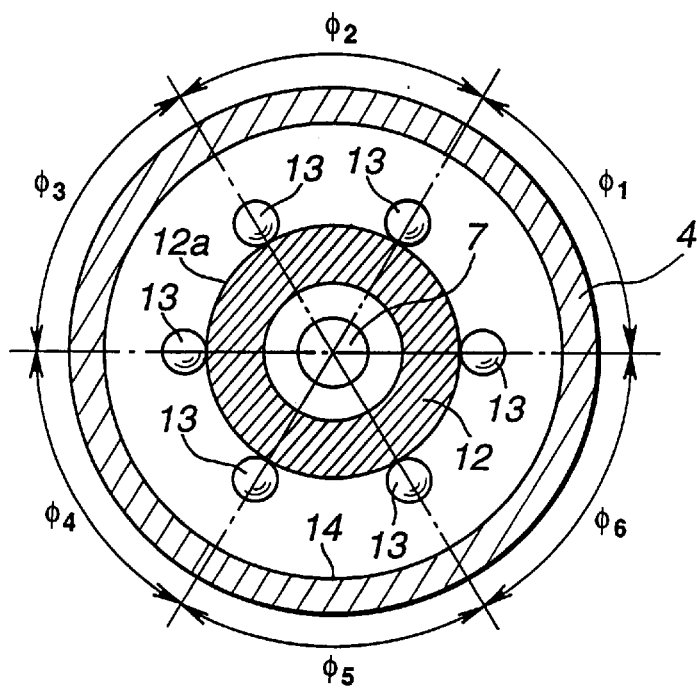
FIG. 3 is a vertical cross-sectional view showing the configuration of the essential portion of the aforementioned disc rotating apparatus.

The case 4 is disposed between the motor rotor 19 and the disc table 5 and secured to the support shaft 7, as shown in FIG. 2. The case 4 has a disc-like bottom plate and ceiling plate and a side wall 14 for closing a portion between the bottom plate and the ceiling plate, the case 4 being made of a nonmagnetic material, as shown in FIG. 3. The case 4 has a central portion joined to the support shaft 7 so that the case 4 is supported coaxially with the support shaft 7.

A plurality of balancer balls 13 serving as the balancing members are accommodated in the case 4. The balancer balls 13 are made of a magnetic material, such as iron or nickel and formed into spheres. Within the case 4, each of the balancer balls 13 is able to move in both the radial direction and the circumferential direction.

A magnet (a permanent magnet) 12 serving as a magnetic-field generating means is disposed in the central portion of the inside portion of the case 4. The magnet 12 is formed into a disc-like shape having a central portion in which a through hole is formed through which the support shaft 7 is inserted. The magnet 12 is disposed coaxially with the support shaft 7. The two poles of the magnet 12 are polarized in a direction perpendicular to the main surface of the case 4, as shown in FIG. 2. That is, the surfaces of the magnet 12 adjacent to the right and reverse sides of the case 4 are formed into magnetic poles. In a period in which the rotation of the support shaft 7 is stopped, the magnet 12 attracts the balancer balls 13 in the case 4 so that the balancer balls 13 are continuously brought into contact with the outer surface 12a of the magnet 12 regardless of the direction of the support shaft 7. That is, the magnet 12 generates a magnetic force which is sufficiently large to attract the balancer balls 13, which are positioned at arbitrary positions in the case 4, into the direction toward the center of rotation and to cause the balancer balls 13 to be adsorbed to the outer surface 12a of the magnet 12.

The magnetic flux generated by the magnet 12 is allowed to pass through each of the balancer balls 13 in the case 4 at a density higher than that in the air. Therefore, the balancer balls 13 are equally disposed with respect to one another. That is, angles $\phi_1$, $\phi_2$, $\phi_3$, $\phi_4$, $\phi_5$ and $\phi_6$ among the balancer balls 13 with respect to the center of the support shaft 7 are the same, as shown in FIG. 3. An assumption is made that the distance from the rotational center of the support shaft 7 to the center of each of the balancer balls 13 in a state where the balancer balls 13 is adsorbed to the outer surface 12a of the magnet 12 is $r_1$. The distance $r_1$ is the same as the sum of the radius $R_1$ of the magnet 12 and the radius of each of the balancer balls 13. Another assumption is made that the attracting force generated by the magnetic force of the magnet 12 and acting on each of the balancer balls 13 is $f_1$.

When an operating electric current is supplied to the stator coil 17 of the spindle motor 3 to rotate the motor rotor 19, the motor rotor 19, the support shaft 7, the case 4, the disc table 5 and the recording disc mounted on the disc table 5 are integrally rotated. That is, the motor rotor 19, the support shaft 7, the case 4, the disc table 5 and the recording disc constitute the composite rotor. When the foregoing composite rotor is rotated, also each of the balancer balls 13 is rotated around the axis of rotation of the support shaft 7. After the rotational speed of the rotor has reached the working speed, each balancer ball 13 has been brought into contact with a side wall 14 by centrifugal force, as shown in FIG. 4.

Figure 5:
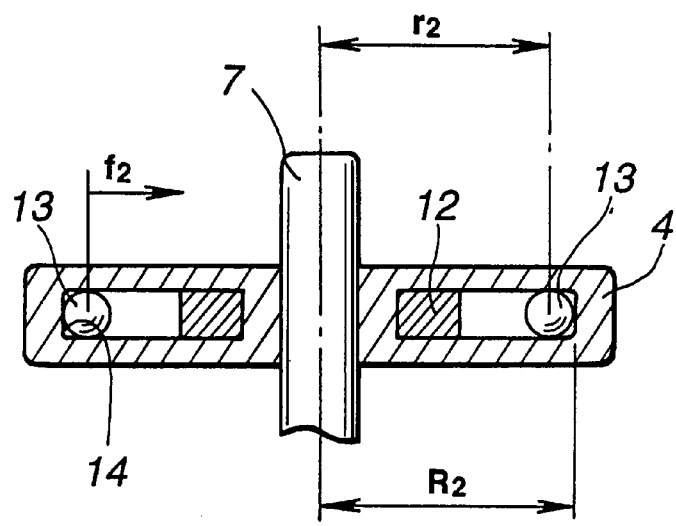
FIG. 5 is a vertical cross-sectional view showing a configuration of an essential portion of the aforementioned disc rotation control apparatus.

An assumption is made that the distance from the center of rotation of the support shaft 7 to the center of each of the balancer balls 13 in a state in which the balancer balls 13 are brought into contact with the side wall 14 is $r_2$ as shown in FIG. 5. The distance $r_2$ is the same as the difference obtained by subtracting the radius of each of the balancer balls 13 from the radius $R_2$ of the side wall 14. Another assumption is made that the attracting force of the magnetic force generated by the magnet 12 and acting on each of the balancer balls 13 is $f_2$. The attracting force $f_2$ is smaller than the centrifugal force acting on each of the balancer balls 13.

Figure 4:
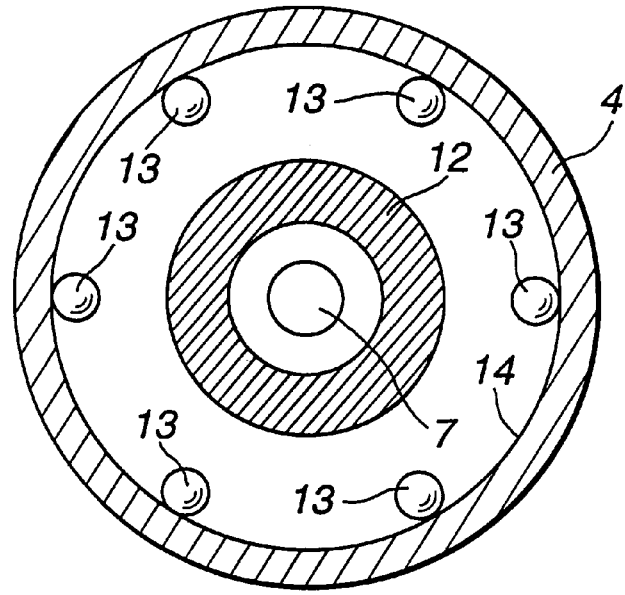
FIG. 4 is a horizontal cross-sectional view showing a configuration of an essential portion of the aforementioned disc rotation control apparatus.

If the recording disc, which is rotated, has no imbalance (eccentric center of gravity) in terms of the weight, or if the recording disc is not mounted on the disc table 5, the balancer balls 13 are positioned at the same angular intervals around the center of rotation of the support shaft 7, as shown in FIG. 4.

Figure 6:
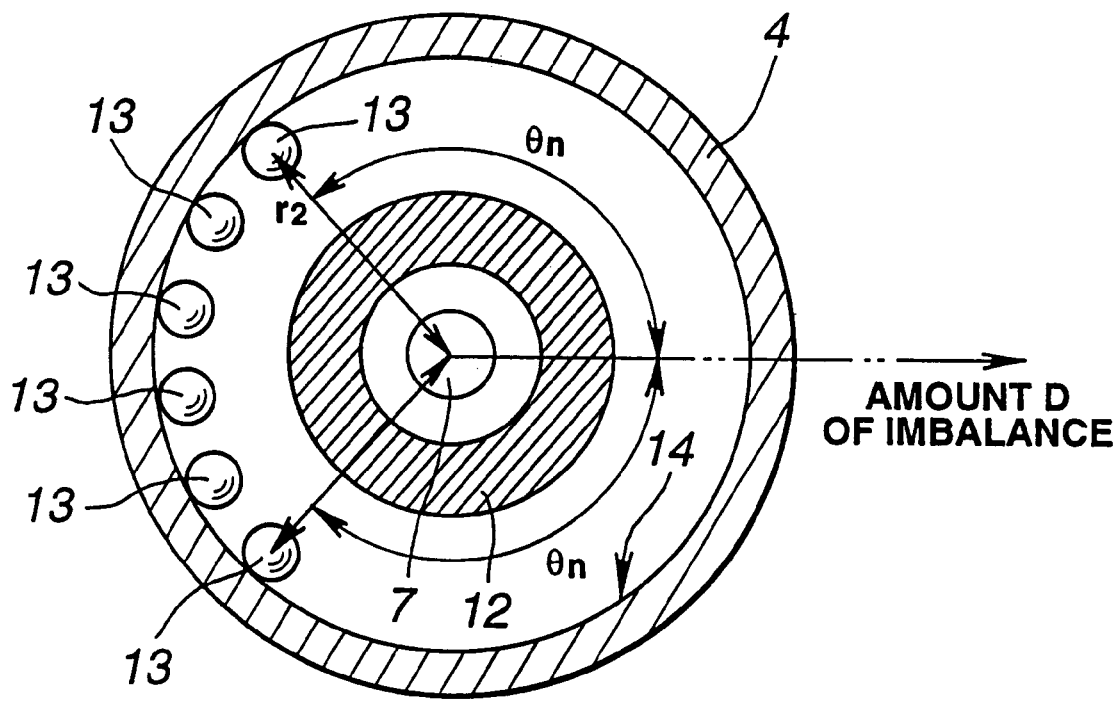
FIG. 6 is a horizontal cross-sectional view showing a configuration of an essential portion of the aforementioned disc rotation control apparatus after the center of gravity is adjusted.

If a recording disc having an imbalance in terms of the weight and mounted on the disc table 5 is being rotated, that is, if the composite rotor has an imbalance, the balancer balls 13 are, in the case 4, moved to the positions at which the imbalance can be canceled in accordance with the direction and quantity D of the imbalance, as shown in FIG. 6. That is, the balancer balls 13 rotate individually from the rotor even after the rotor has been rotated. Then, the balancer balls 13 are caused to relatively stand still and thus rotated together with the case 4. Then, each of the balancer balls 13 is gradually moved to a position opposite to the direction of the imbalance.

The position of each of the balancer balls 13 realized when the balancer balls 13 have canceled the imbalance will now be described. As shown in FIG. 6, the balancer balls 13 are disposed at the same intervals in an angular range from $+\theta n$ made from the direction of the imbalance (that is, in a direction in which the center of gravity of recording disc exists when viewed from the rotational center of the support shaft 7) to $-\theta n$ across a direction opposite to the direction of the imbalance (that is, no balancer ball 13 exists in the angular range of $\pm\theta n$ made from the direction of the imbalance). Assuming that the mass of each of the balancer balls 13 is m, the angle $\theta n$ satisfies the following relationships:

$$mr_2 \Sigma_{n-1}^{K} \cos\theta\ n \approx D$$

$$mr_2 \Sigma_{n-1}^{K} \sin\theta\ n \approx 0$$

At this time, the center of gravity of all of the balancer balls 13 is positioned opposite to the direction of the imbalance across the center of rotation. That is, the center of gravity is positioned on the line opposite to the direction of the imbalance.

In the above-mentioned state, the center of gravity which is the combination of the center of gravity of the composite rotor deviated from the center of rotation because of the imbalance of the recording disc and the center of gravity of the balancer balls 13 is positioned on the axis of rotation of the composite rotor. Therefore, the composite rotor is able to rotate without any vibration.

As described above, when a recording disc having an imbalance is rotated, each of the balancer balls 13 is arbitrarily moved by a so-called automatic aligning effect. Thus, the position of the composite center of gravity including that of the rotor can be positioned on the axis of rotation. As a result, vibrations of the rotor can be prevented, thus causing the recording disc having an imbalance to be rotated smoothly.

If the amount of imbalance of the recording disc is too large, the balancer balls 13 come closer to one another because of the automatic aligning effect in such a manner that the position of the composite center of gravity including the rotor is brought to a position on the axis of rotation. The automatic aligning effect can effectively be obtained when the rotational frequency of the rotor is higher than the resonant frequency (the resonant frequency in a direction of a plane (plane x, y shown in FIG. 1) perpendicular to the axis of rotation of the rotor) of the dampers 2. The automatic aligning effect can effectively be obtained when the structure of the present invention is applied to a rotor, such as a recording disc for recording or reproducing an information signal at high speed, which must be rotated at high speed.

Since the balancer balls 13 of the rotation control apparatus according to this embodiment are disposed at the same intervals during stoppage of the rotation of the rotor, the balancer balls 13 do not generate an imbalance when the rotation of the rotor is started.

Therefore, the disc rotation control apparatus having the balancer balls 13 is able to prevent vibrations even if a recording disc having a weight imbalance is rotated. That is, the disc drive unit is able to satisfactorily read an information signal from a signal recording surface of the recording disc having imbalance in terms of the weight or write an information signal on the information recording surface of the same. Even if a state of the member constituting the composite rotor is not constant, that is, for example, the recording disc forming a portion of the rotor is a removable media, the balancer balls 13 are able to effectively prevent vibrations because of the automatic aligning effect.

Figure 7:
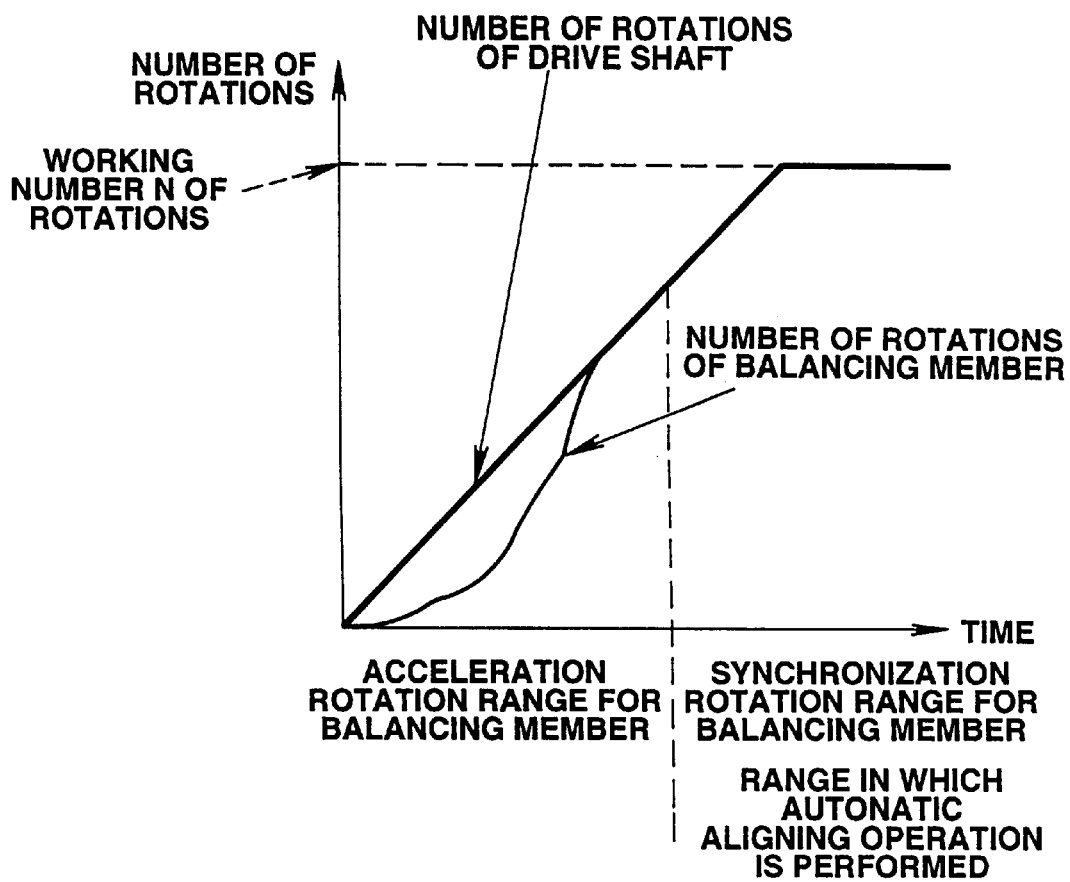
FIG. 7 is a graph showing a transition of the rotation speed of the rotor and the balancing member in the aforementioned rotation control apparatus.

When the rotation of the spindle motor 3 of the disc rotation control apparatus is started, that is, when the rotor starts rotating, the automatic aligning effect can quickly be obtained in a case in which movement of the balancer balls 13 is synchronously started without relative movement of the balancer balls 13 with respect to the rotor (the case 4). That is, it is preferable that the difference between the rotational speed of the rotor (the drive shaft) and that of each balancer ball 13 is zero at least when the rotational speed of the rotor reaches the working range (the rotational frequency not lower than the resonant frequency of the dampers 2), as shown in FIG. 7.

The conditions under which the movements of the balancer balls 13 can be started in synchronization with the start of the rotation of the rotor without relative movement will now be described. An assumption is made that a rotational torque which is transmitted from the rotor (the case 4) to the balancer balls 13 is $T_0$, the inertia moment of the balancer balls 13 is J, the acceleration of the rotational angle of the balancer balls 13 is $\beta$ and the starting torque $T_1$ satisfies $T_1 = J\beta$. Another assumption is made that the mass of the balancer balls 13 is m, the distance from the rotational axis of the rotor (the support shaft 7) to the balancer balls 13 is R and the relationship $T_2 = mR$ is satisfied. If the relationship $T_1 + T_2 < T_0$ is satisfied as shown in FIG. 8 when the rotor starts rotating, the movement of each balancer ball 13 can be started in synchronization with the start of rotation of the rotor regardless of the direction (the inclination) of the support shaft 7 (if the axial direction of the support shaft 7 is limited to only the vertical direction, only establishment of $T_1 < T_0$ is required.

Figure 8:
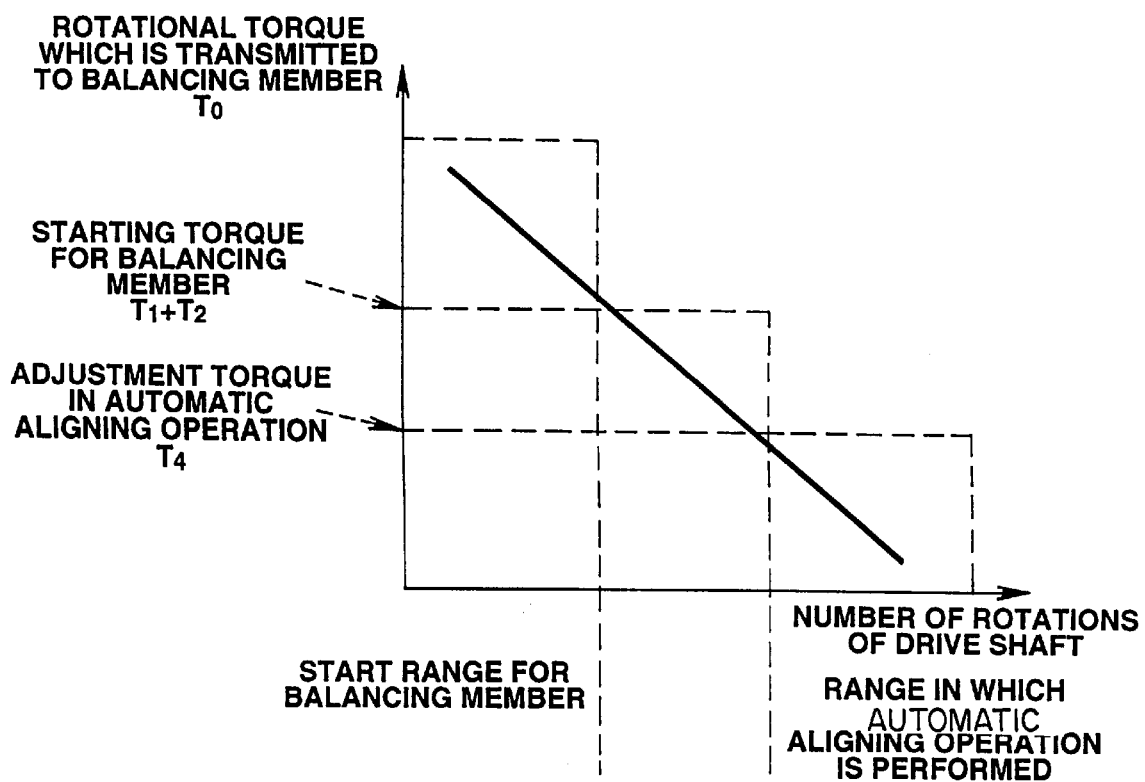
FIG. 8 is a graph showing a transition of the rotation torque transmitted from the rotor to the balancing member in the aforementioned rotation control apparatus.

If the rotational frequency of the rotor is made to be not lower than the resonant frequency (the resonant frequency in a direction of a plane perpendicular to the rotational axis of the rotor) of the dampers 2, the following relationship must be satisfied as shown in FIG. 8:

$$T_0 < T_3$$

on the assumption that an adjustment torque acting on each of the balancer balls 13 for moving the balancer balls 13 in a circumferential direction around the axis of rotation of the rotor is $T_3$. If the foregoing condition is not satisfied, the automatic alignment cannot be performed. If the rotational torque which is transmitted from the rotor (the case 4) to the balancer balls 13 must satisfy the following relationship in a case where the transmission torque $T_0$ is constant regardless of the rotational speed of the rotor:

$$T_1+T_2<T_0<T_3$$

Therefore, the above-mentioned condition can easily be satisfied if the transmission torque $T_0$ is enlarged in a low rotational speed region and reduced in a high rotational speed region ($\omega_1 \leq \omega \leq \omega_2$ when the working rotational speed is $\omega$)

When the halt rotor of the rotation control apparatus starts rotating, the balancer balls 13 follow the rotor due to the starting torque transmitted from the rotor (the case 4) to each of the balancer balls 13 because the balancer balls 13 have been attracted to the magnet 12. Thus, the balancer balls 13 start rotating. That is, each of the balancer balls 13 has been adsorbed to the outer surface 12a of the magnet 12 when the rotor is stopped. Assuming that the rolling coefficient of friction between the balancer balls 13 and the outer surface 12a of the magnet 12 is $\mu_1$, the transmission torque $T_0$ which is transmitted from the rotor to the balancer balls 13 is expressed by the following expression:

$$T_0=\mu_1 f_1 r_1$$

Assuming that the angular acceleration at the start of the rotation is $\beta$, the starting torque $T_1$ is expressed as follows:

$$T_1=mr_1^2\beta$$

Since the relationship $T_1<T_0$ must be satisfied, the following relationships are satisfied:

$$mr_1^2\beta<\mu_1 f_1 r_1$$

$$mr_1\beta<\mu_1 f_1$$

Also magnetic resistance 1 which is generated because the magnetic flux generated by the magnet 12 is allowed to pass through the balancer balls 13, enlarges the transmission torque $T_0$.

In consideration of the dead weight of the balancer balls 13 when the support shaft 7 is made to be horizontal and a necessity that the balancer balls 13 are separated from the magnet 12 by the centrifugal force in the working rotation range $\omega$ ($\omega_1 \leq \omega \leq \omega_2$), the following relationship must be satisfied:

$$mg<f_1<mr_1\omega_1^2-mg$$

wherein g is a gravitational acceleration. If the foregoing condition is satisfied, each of the balancer balls 13 is separated from the outer surface 12a of the magnet 12 by the centrifugal force when the rotor is rotated at high speed. At this time, the transmission torque $T_0$ is reduced, thus causing the condition under which the automatic alignment can be performed to easily be satisfied. Assuming that the rolling coefficient of friction between the balancer balls 13 and the side wall 14 is $\mu_2$, the transmission torque which is generated when the balancer balls 13 are in contact with the side wall 14 is expressed by the following equation:

$$T_0=\mu_2 r_2 (mr_2\omega_2^2-f_2+mg)$$

The transmission torque $T_0$ must be smaller than the adjusting torque $T_3$. If the rotational speed of the rotor is lower than the working rotational speed range, each of the balancer balls 13 can again be absorbed to the outer surface 12a of the magnet 12 under the following condition:

$$mg<f_2<mr_2\omega_1^2-mg$$

The most effective number of the balancer balls will now be described.

The above-mentioned automatic aligning mechanism has been proved by Thearl's automatic balancer. As for the detailed structure of the Thearl's automatic balancer, refer to "Mechanical Dynamics" p.p. 146 and 147 (March 1982) published by Riko-Gaku Shuppan.

Figure 9:
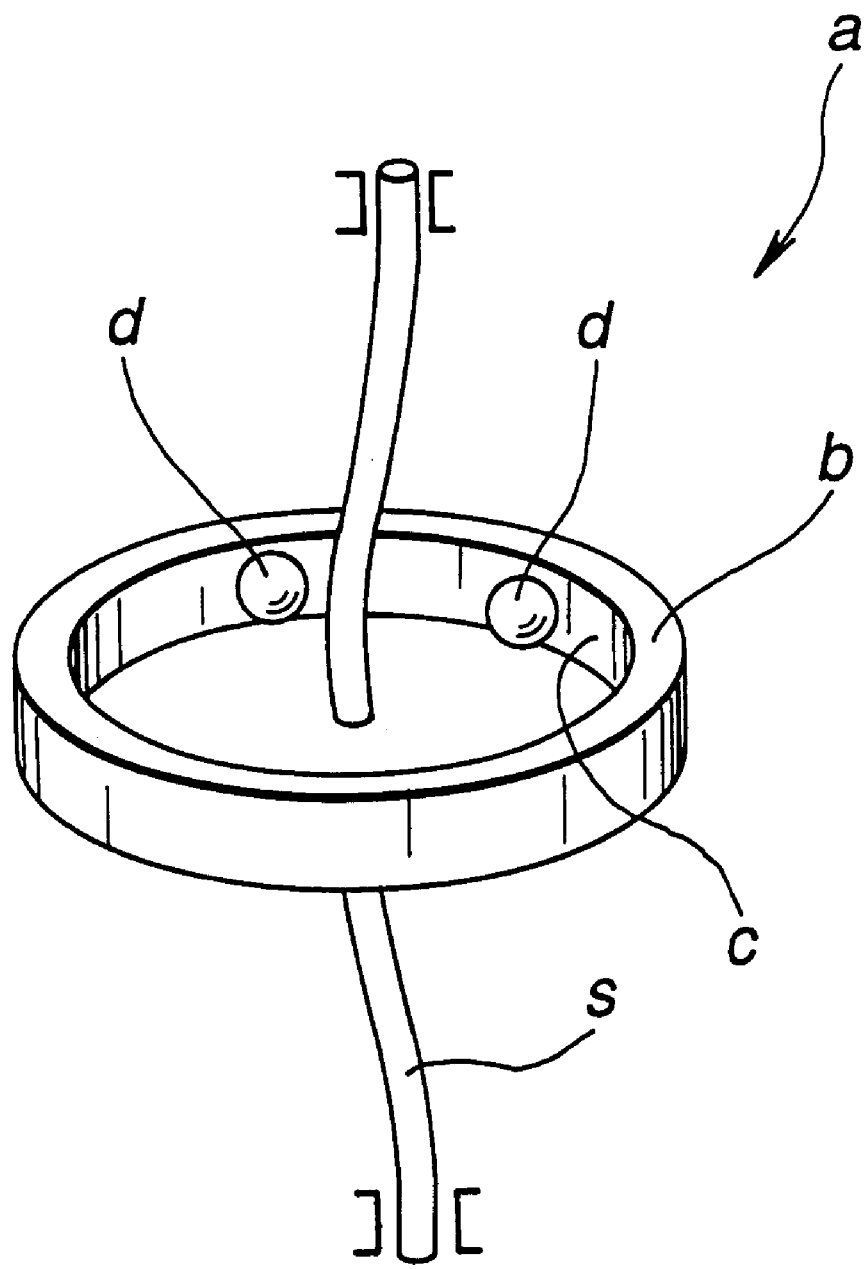
FIG. 9 is a perspective view for explanation of the concept of the principle of the automatic gravity center adjustment mechanism of a Thearl's automatic balancer.
Figure 10:
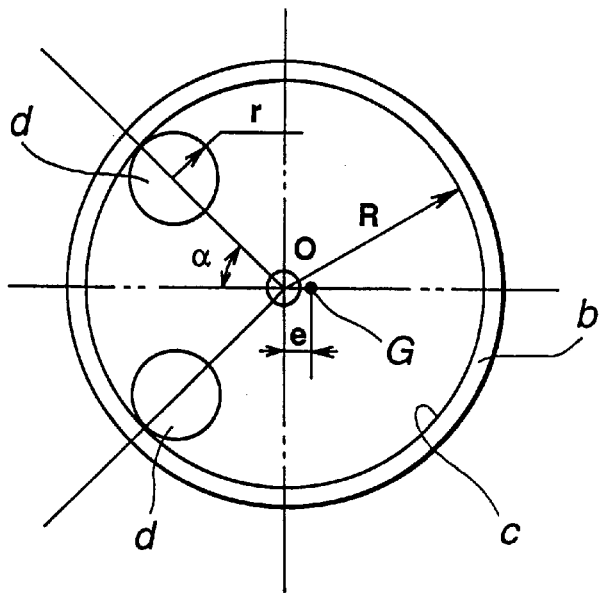
FIG. 10 is an enlarged horizontal cross-sectional view of the automatic gravity center adjustment mechanism in a state after an automatic gravity center adjustment is carried out for a small eccentricity.
Figure 11:
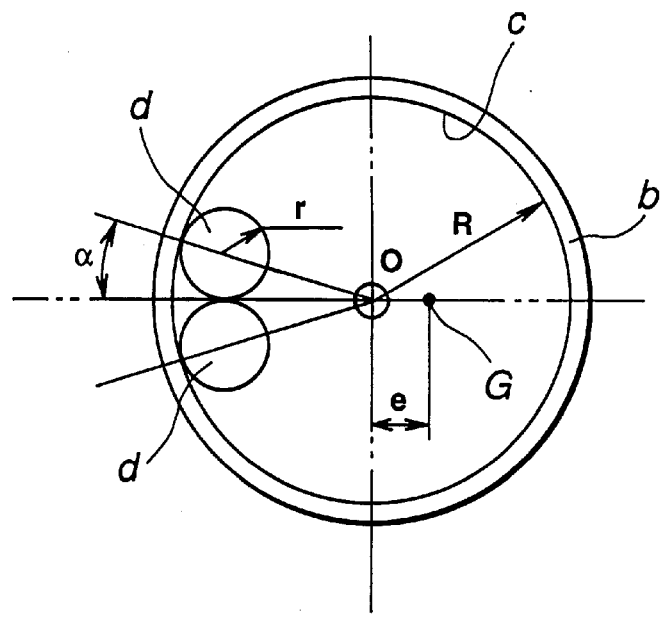
FIG. 11 is an enlarged horizontal cross-sectional view of the automatic gravity center adjustment mechanism in a state after an automatic gravity center adjustment is carried out for a large eccentricity.

A Thearl's automatic balancer a will now be described with reference to FIGS. 9 to 11. The Thearl's automatic balancer a includes a rotative disc b; two steel balls (the balancer balls) d disposed to be movable in a groove c formed in the rotative disc b; and rotational shaft s. When the rotational speed of the rotative disc b has exceeded the specific circular frequency (dangerous speed), the steel balls d are automatically brought to positions at which the following relationship is satisfied:

$$Me=2m (R-r)\cdot\cos \alpha$$

wherein M: masses of rotative disc b and rotor portion of rotational shaft s e: amount of eccentricity of rotor portion m: mass of steel balls d R: radius of a movable range in which steel balls d are moved $\alpha$: angle made between a direction of eccentricity and steel balls d at center of rotation r: radius of steel balls d Thus, the Thearl's automatic balancer cancels eccentricity of the rotative disc b to prevent vibrations of the rotor portion.

The reason why the Thearl's automatic balancer a is operated when the rotational speed of the rotative disc b has exceeded the specific circular frequency or the rotational shaft s will briefly be described. In the foregoing state, the movement of the center of gravity G and movements of the steel balls d are made to be opposite phases, causing the steel balls d to be moved and disposed in a direction opposite to the direction of the eccentricity.

When the Thearl's automatic balancer is applied to a disc rotation drive apparatus for a CD-ROM, it is preferable that the radius R of the rotative disc b satisfies R=12 mm because of the sizes of the rotating motor and the turn table.

The size of the steel balls d capable of canceling (realizing equilibrium) an amount of imbalance of 1 g.cm of the recording disc can be obtained by the following calculations. An assumption is made that the material of the steel balls is stainless steel (SUS440C) having density $\rho$ satisfying $\rho=7.7$ g/cm$^3$.

The steel balls d are able to cancel the largest amount of imbalance when the combined center of gravity of the steel balls d in a contact state is positioned in a direction opposite to the mass eccentricity G of the recording disc. The foregoing state can be expressed by the following equation:

$$\cos\alpha = \frac{(R^2 - 2Rr)^{1/2}}{R-r}$$

$\alpha$: angle between direction of eccentricity and steel ball d

R: radius (R=12 mm) of a movable range in which steel balls d are moved r: radius of steel balls d Therefore, the amount B (r) of imbalance at this time can be expressed by the following equation:

$$B(r) = 2 \times (4/3)\pi r^3 \cdot \rho \cdot \frac{(R^2 - 2Rr)^{1/2}}{R-r}$$

When the foregoing condition is substituted for the foregoing equation, the following equation can be obtained:

$$l(g \cdot cm) = 8/3\pi r^3 \times 7.7 \times \frac{(12^2 - 24r)^{1/2}}{12-r}$$

wherein r≈0.026 (cm)

Therefore, the steel balls d must have the radius r=0.26 cm or larger to cancel the amount of imbalance of 1 g.cm.

Figure 12:
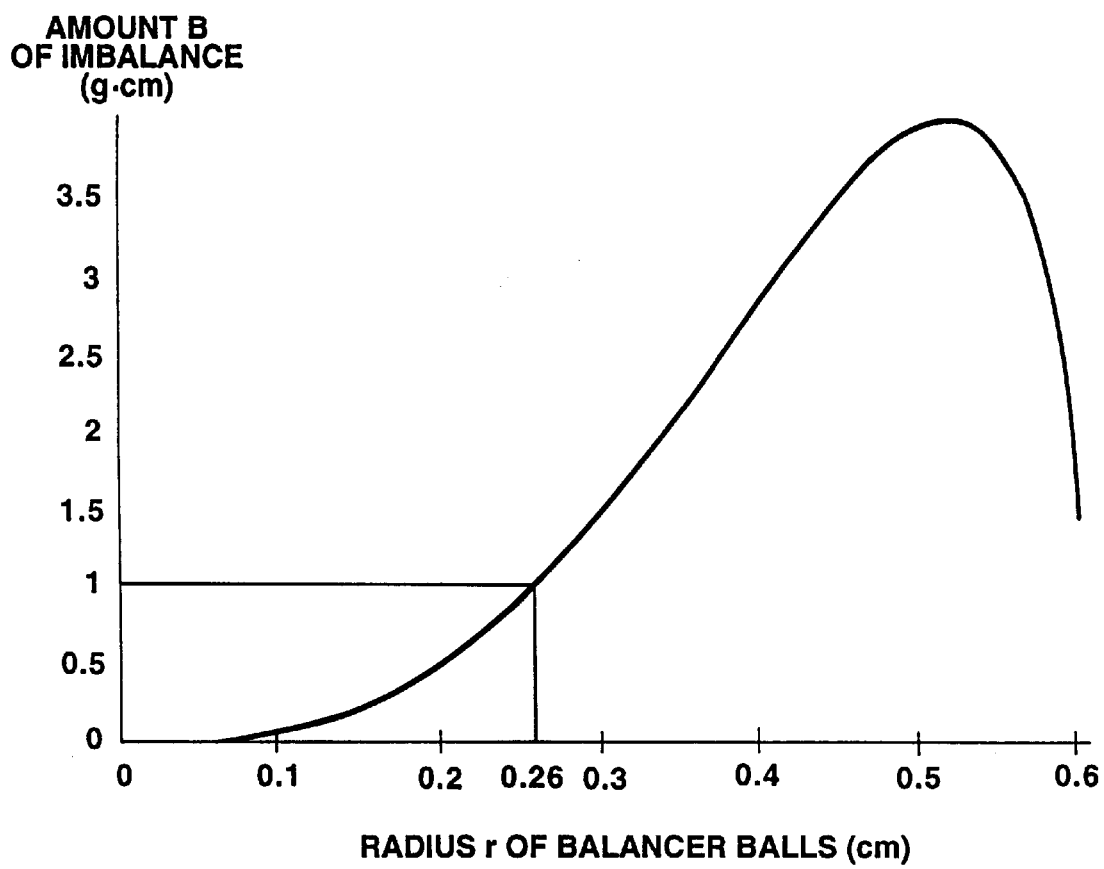
FIG. 12 is a graph showing the relationship between the imbalance amount and the radius of the balancer ball under predetermined conditions.

FIG. 12 is a graph showing the relationship between the amount of imbalance and the radius of the steel balls.

As can be understood from the graph, an amount of imbalance of 4 g.cm or smaller can be canceled under the above-mentioned condition. The radius of each steel ball satisfies r=0.5 cm. If steel balls with larger diameters used, the amount of imbalance which can be canceled cannot be enlarged.

When the Thearl's automatic balancer a is applied to a disc rotation drive apparatus for a CD-ROM, the amount of 1 g.cm can be canceled only in a case where the radius of each steel balls d satisfies r≧0.26 cm, that is, the diameter satisfies 2r=0.52 cm. Therefore, there arises a problem in that the thickness (the size in the axial direction) of the automatic balancer a cannot be reduced.

Figure 13:
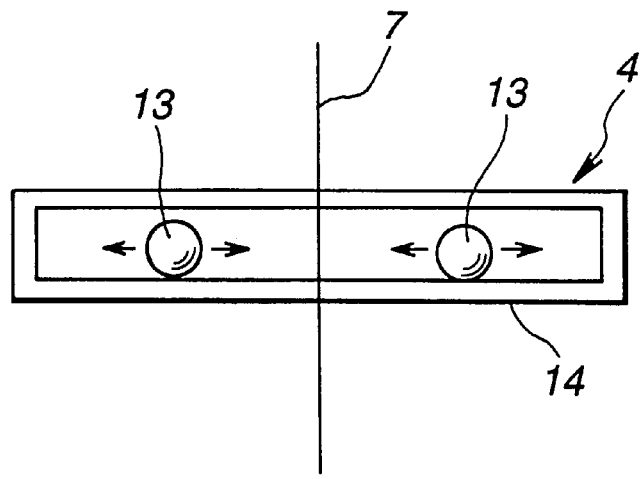
FIG. 13 is a vertical cross-sectional view showing the basic configuration of the automatic gravity center adjustment mechanism.

Referring to FIG. 13, the automatic aligning mechanism 4 includes a case 14 having an annular movable space and a plurality of balancing balls 13 movably disposed in the movable space in the case 14. The case 24 corresponds to the rotative disc b of the Thearl's automatic balancer a and the balancing balls 13 correspond to the steel balls d of the same.

Figure 14:
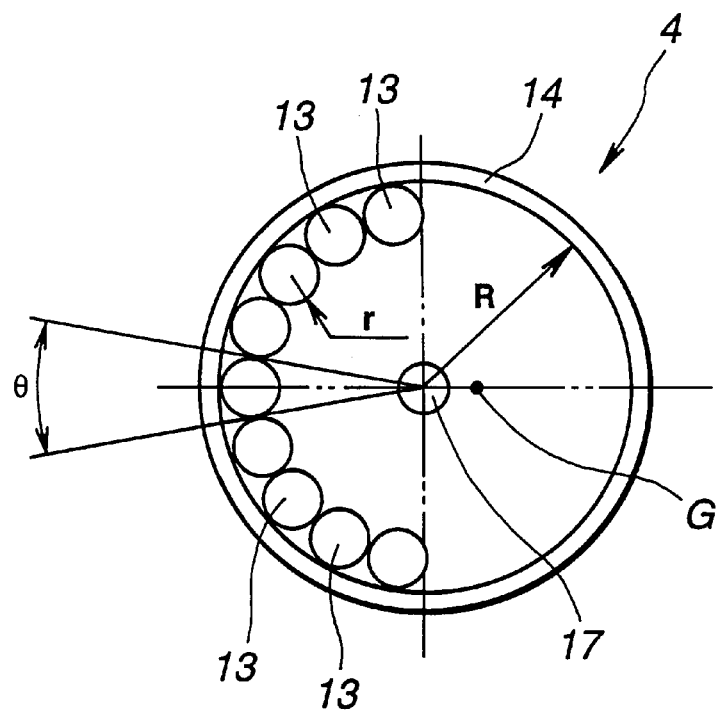
FIG. 14 is a horizontal cross-sectional view showing the basic configuration of the automatic gravity center adjustment mechanism.

As shown in FIG. 14, the automatic aligning mechanism 4 has the balancing balls by the number (n) which is expressed by the following expression:

n=180/θ+0.5 (discard all digits to the right of the decimal point)

wherein θ: angle of the balancer balls disposed in the outer portion in which θ=2sin$^{-1}$ {r/(R−r)}

R: radius of movable space r: radius of each balancer ball

Therefore, the size (the radius r) and the number (n) of the balancer balls 13 are determined by the radius (R) of the movable space permitted for the balancer ball 13. When the radius (R) of the movable space is made to be constant, the relationship between the size of each balancer balls 13 capable of canceling the largest amount of imbalance, and the number of the balancer balls 13 can be obtained.

When the amount of cancellation (that is, the amount of imbalance which varies depending on the rotation drive apparatus and which is B=1 g.cm for a disc drive unit to be described later) with respect to the required mass eccentric G, the relationship between the size and the number of the balancer balls 13 under the determined condition can be obtained. When the smallest size is selected in accordance with the relationship between the two factors (the size and the number), the thickness of the automatic aligning mechanism 4 can be reduced.

Figure 15:
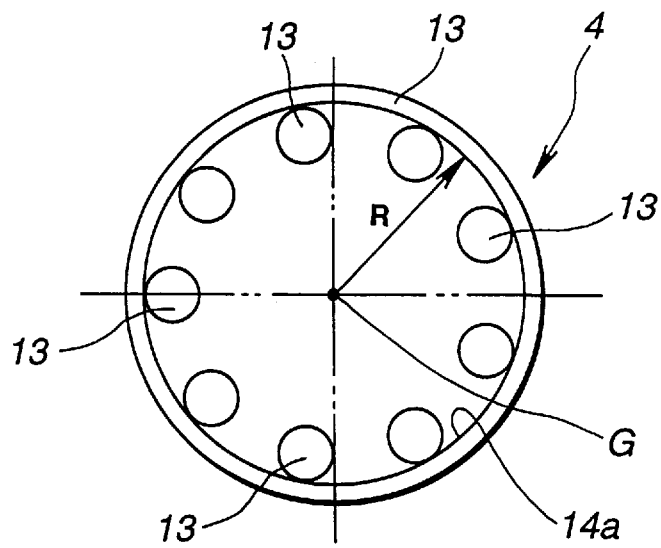
FIG. 15 is an enlarged horizontal cross-sectional view showing the position of the balancer balls when the eccentricity is small.

In a case of a CD-ROM drive, the radius R=12 mm in the structure shown in FIG. 15.

To cancel the permissible imbalance of B=1 g.cm for the CD-ROM, the size (the radius r) and number (n) of the balancer balls 13 are obtained by the following calculation. The material of the balancer balls 13 is stainless steel (SUS440C having density ρ=7.7 g/cm$^3$) similar to that described in the prior art.

An assumption is made that the number (n) of the balancer balls is as follows:

n=180/θ+0.5 (all digits to the right of the decimal point are discarded)

wherein θ: angle of balancer balls disposed in the outer portion in which θ=2sin$^{-1}$ {r/(R−r)}

R: radius of movable space r: radius of each balancer ball

Assuming that the radius of each of the balancer balls 13 is r=1.8 mm, the angle θ can be expressed as follows:

$$\theta = 2\sin^{-1}\{r/(R-r)\}$$
$$= 2 \times \sin^{-1}\{1.8/(12-1.8)\}$$
$$= 20.3°$$

Thus, the angle of the balancer balls 13 each having a radius of r=1.8 mm when the balancer balls 13 are disposed in the outer portion 14a in the movable space is 20.3°.

As a result, the number (n) of the balancer balls 13 is calculated as follows:

$$n = 180/\theta + 0.5$$
$$= 180/20.3 + 0.5$$
$$= 9.37$$

Discarding all digits to the right of the decimal point, the number is made in such a manner that n=9. Therefore, the number of the balancer balls 13 of the automatic aligning mechanism 4 of the CD-ROM drive unit according to this embodiment is made to be 9.

Figure 16:
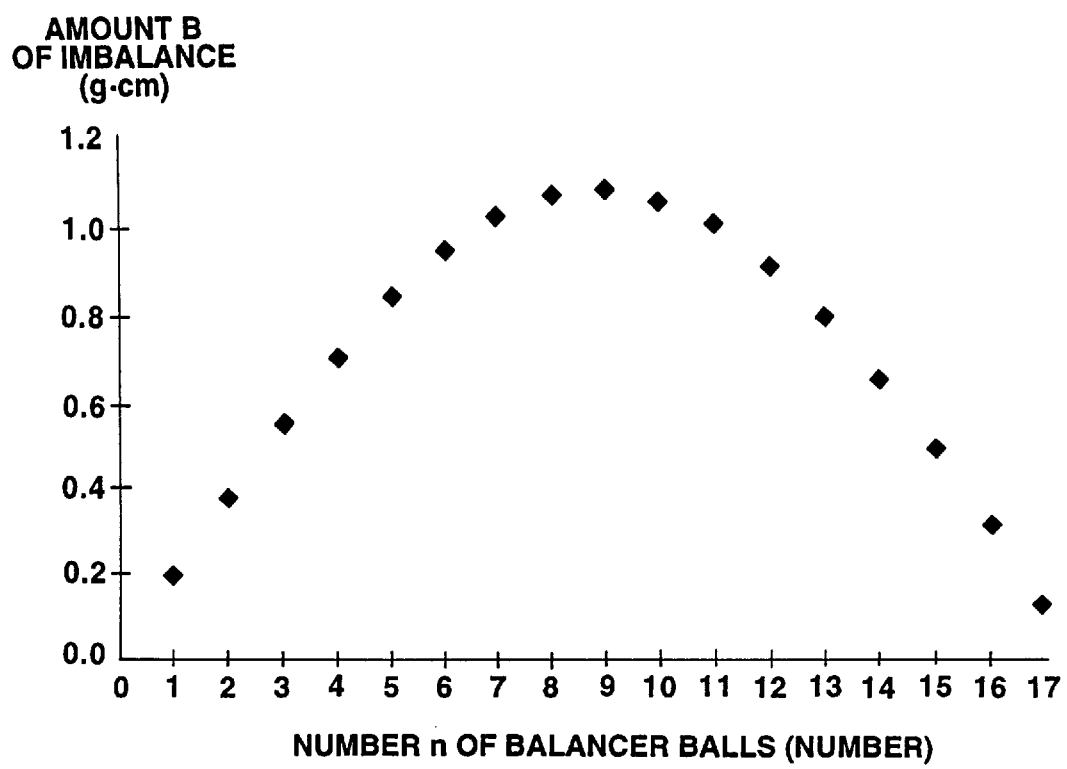
FIG. 16 is a graph showing the relationship between the number of the balancer balls and the imbalance amount which can be canceled by the balancer balls.

FIG. 16 is a graph showing the relationship between the number of the balancer balls 13 and the amount of imbalance which can be canceled by the balancer balls 13 when the radius of the movable space is R=12 mm, the radius of each of the balancer balls r=1.8 mm and the material of the balancer balls 13 is stainless steel (SUS440C having a density ρ=7.7 g/cm$^3$). As can be understood from the graph, the largest amount of imbalance can be canceled when the number of the balancer balls 13 is n=9.

When the number of the balancer balls is an odd number, the following equation 1 is employed to calculate the amount of imbalance. When the number is an even number, the following equation 2 is employed.

$$B = m(R-r) + \sum_{k=0}^{(n-1)/2} 2m(R-r)\cos(k\theta) \quad (1)$$

$$B = \sum_{k=0}^{n/2} 2m(R-r)\cos(\theta/2 + k\theta) \quad (2)$$

wherein B: amount of imbalance m: mass of the balancer balls m=4/3×πr$^3$ρ

ρ: density

R: radius of movable space r: radius of balancer ball n: number of balancer balls Table 1 shows the size (the radius r) and number n=180/θ+0.5 (all digits to the right of the decimal point are discarded) and the amount (B) of imbalance which can be canceled when the radius of the movable space is R=12 mm and the density of the balancer balls 13 is ρ=7.7 g/cm³.

TABLE 1

| Radius r of Balancing Ball (cm) | Angle θ of Balancer Balls (deg) | Number of Balancer Balls n (number) | Amount of Imbalance B (g · cm) |
|---|---|---|---|
| 0.10 | 10.4 | 17 | 0.39 |
| 0.11 | 11.6 | 16 | 0.46 |
| 0.12 | 12.8 | 14 | 0.54 |
| 0.13 | 14.0 | 13 | 0.62 |
| 0.14 | 15.2 | 12 | 0.71 |
| 0.15 | 16.4 | 11 | 0.80 |
| 0.16 | 17.7 | 10 | 0.89 |
| 0.17 | 19.0 | 9 | 0.99 |
| 0.18 | 20.3 | 9 | 1.09 |
| 0.19 | 21.7 | 8 | 1.19 |
| 0.20 | 23.1 | 8 | 1.29 |
| 0.21 | 24.5 | 7 | 1.39 |
| 0.22 | 25.9 | 7 | 1.50 |
| 0.23 | 27.4 | 7 | 1.60 |
| 0.24 | 29.0 | 6 | 1.71 |
| 0.25 | 30.5 | 6 | 1.82 |
| 0.26 | 32.1 | 6 | 1.92 |
| 0.27 | 33.8 | 5 | 2.02 |
| 0.28 | 35.4 | 5 | 2.14 |
| 0.29 | 37.2 | 5 | 2.24 |
| 0.30 | 38.9 | 5 | 2.33 |

The amount of imbalance which must be canceled for the CD-ROM drive unit is B=1 g.cm. When the closest approximation value satisfying the amount of imbalance B≧1 g.cm is selected from Table 1, the radius r of each of the balancer balls 13 is 1.8 mm and the number n=9.

Thus, the number (n) and size (the radius r) of the balancer balls 13 can be determined under the above-mentioned conditions (the radius R of the movable space is R=12 mm and the density of the balancer balls ρ=7.7 g/cm³). When the size and the number of the balancer balls 13 are selected to correspond to the amount of imbalance (B≧1 g.cm) which must be canceled, the smallest balancer balls can be selected. Thus, the thickness of the automatic aligning mechanism 4 can be reduced.

Figure 17:
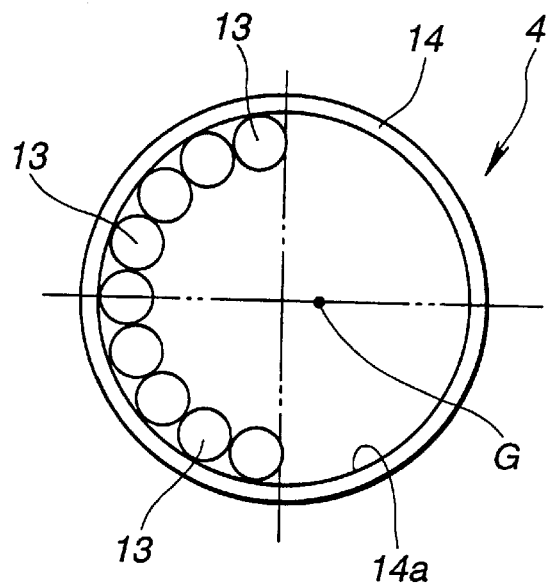
FIG. 17 is an enlarged horizontal cross-sectional view showing the position of the balancer balls when the eccentricity is at its maximum.

If the CD-ROM has no imbalance in terms of the weight, the balancer balls 13 are positioned at substantially the same intervals in the circumferential direction in the movable space, as shown in FIG. 15. If the CD-ROM has weight imbalance, the balancer balls 13 are moved to positions at which the imbalance can be canceled. Thus, the aligning operation is performed. If the amount of imbalance is 1 g.cm, the balancer balls 13 are positioned in a direction opposite to the direction of the eccentricity of the CD-ROM and brought to a state in which the balancer balls 13 are in contact with one another, as shown in FIG. 17. As a result, the largest amount of imbalance (B=1 g.cm) for the balancer balls 13 can be canceled.

In the above-mentioned state, the overall center of gravity of the case 14 deviated from the center of rotation because of the mass eccentricity G of the CD-ROM and the balancer balls 13 are positioned on the rotational axis of the composite rotor. As a result, imbalance of the composite rotor can be canceled and thus aligning operation can be performed.

When a CD-ROM having imbalance is rotated, the balancer balls 13 are arbitrarily moved because of the so-called automatic aligning effect. As a result, the position of the combined center of gravity is positioned on the axis of rotation. Therefore, the composite rotor can be rotated without vibrations.

Figure 18:
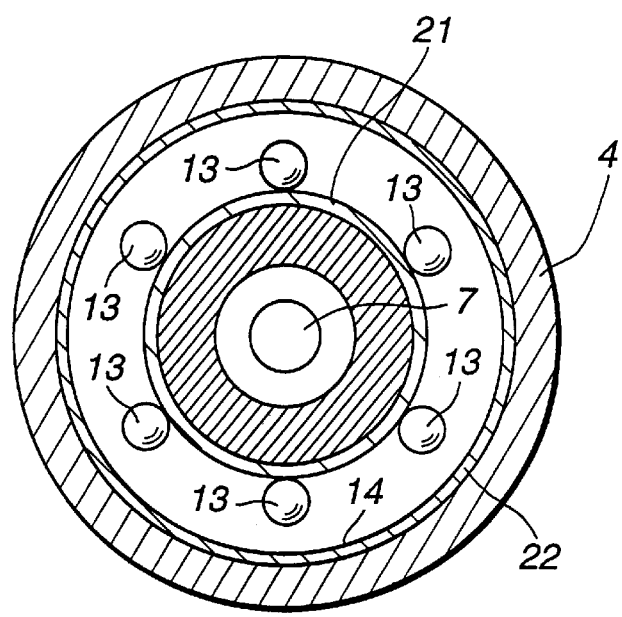
FIG. 18 is a cross-sectional view showing the aforementioned rotation control apparatus according to an embodiment in which a collision sound prevention member is provided for a collision between the magnet protection member and the balancing member.

The rotation control apparatus may have a structure that a buffer member 22 made of synthetic resin or rubber may be provided on the inner surface of the side wall 14, as shown in FIG. 18. Thus, noise generated when the balancer balls 13 collide with the side wall 14 and noise (friction noise and rolling noise) generated when the balancer balls 13 move can be prevented.

The rotation control apparatus according to this embodiment may have a magnet protective member 21 made of nonmagnetic material, such as a synthetic resin material and disposed in an outer portion of the magnet 12, as shown in FIG. 18. In this case, generation of noise and damage of the magnet 12 due to collisions of the balancer balls 13 against the outer portion of the magnet 12 can be prevented. The protective member may be disposed on the outer surface of each of the balancer balls 13.

Figure 19:
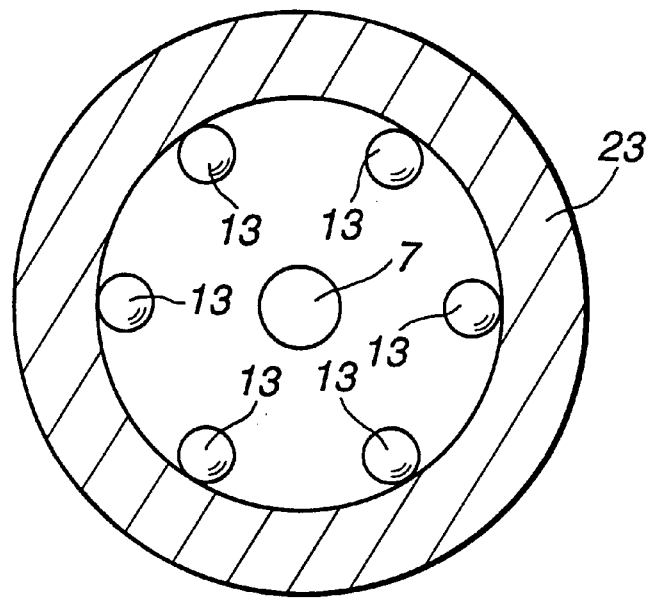
FIG. 19 is a cross-sectional view showing the aforementioned rotation control apparatus according to an embodiment in which the rotor is surrounded by an external wall made from a magnet.

The magnetic field generating means of the rotation control apparatus may be an outer-wall magnet 23 forming an outer wall of the case 4, as shown in FIG. 19. In this case, the balancer balls 13 are always adsorbed to the inner surface of the outer-wall magnet 23 regardless of the rotational speed of the rotor. Since the balancer balls 13 are moved along the inner surface of the outer-wall magnet 23, the automatic aligning effect can be obtained.

Figure 20:
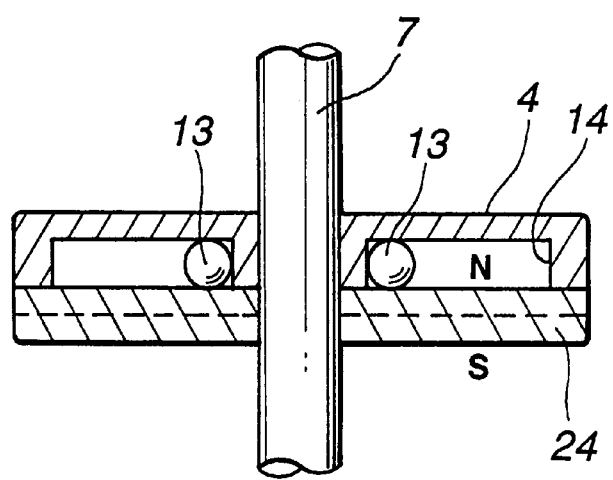
FIG. 20 is a cross-sectional view showing the aforementioned rotation control apparatus according to an embodiment in which the bottom portion of the rotor is made from a magnet.

The magnetic field generating means of the rotation control apparatus may be a bottom magnet 24 forming a bottom plate (or a ceiling plate) of the case 4, as shown in FIG. 20. Also in this case, the adsorbing force of the bottom magnet 24 acting on each of the balancer balls 13 enlarges the transmission torque $T_0$ which is transmitted to each of the balancer balls 13 when the operation of the rotation control apparatus has been started.

Figure 21:
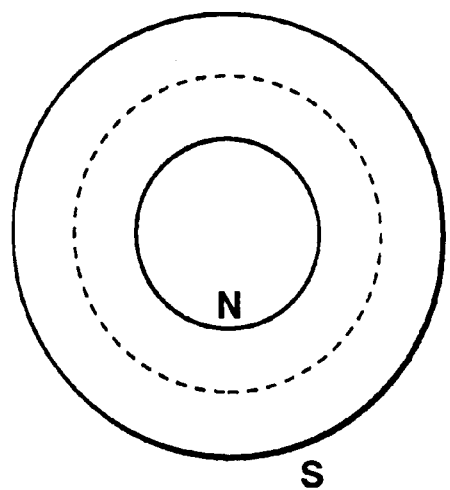
FIG. 21 is a plan view showing a magnetized state of the magnet constituting the aforementioned rotation control apparatus.
Figure 22:
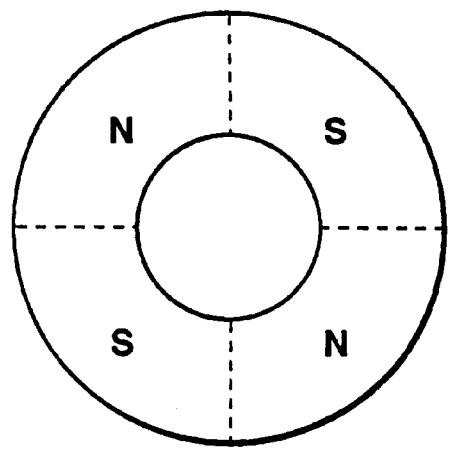
FIG. 22 is a plan view showing a magnetized state of the magnet constituting the aforementioned rotation control apparatus according to another embodiment.

The direction of polarization of each of the foregoing magnets 12, 23 and 24 is not limited to the direction perpendicular to the main surface. Polarization may be performed in such a manner that the inner and outer portions are made to be magnetic poles, as shown in FIG. 21. A multi-pole polarization structure shown in FIG. 22 may be employed in which the magnetic poles are disposed in the circumferential direction. In either case, the adsorbing force acting on each of the balancer balls 13 enlarges the transmission torque $T_0$ which is transmitted to each of the balancer balls 13 when the operation of the apparatus has been started. Since a magnetic flux having a high density is formed in the boundary between the magnetic poles, the balancer balls 13 approach the boundary. When the magnet having the multi-pole polarization is disposed in the central portion of the case 4, the balancer balls 13 are located on the boundary between the magnetic poles. Moreover, the force for causing the balancer balls 13 to approach the boundary enlarges the transmission torque $T_0$.

Figure 23:
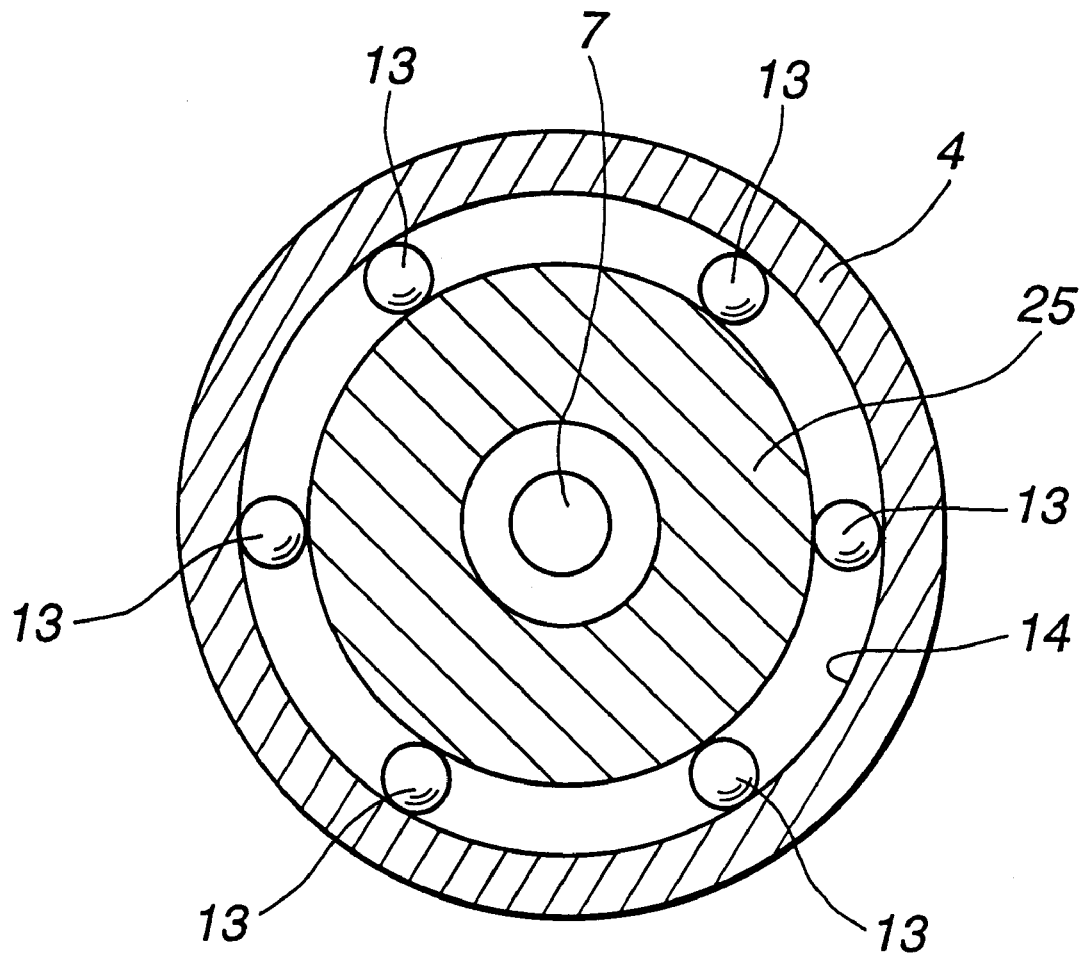
FIG. 23 is a horizontal cross-sectional view showing a configuration of the essential portion of the rotation control apparatus according to the present invention in which an electric magnet is used as the magnetic field generating means.

The rotation control apparatus may have a structure as shown in FIG. 23 where the magnetic field generating means is an electromagnet 25. The electromagnet 25 is excited when the halt rotor starts rotating. When the rotational frequency of the rotor has been raised to a frequency not lower than the resonant frequency (the working rotational speed range) of the dampers 2 in a direction of a plane perpendicular to the rotational shaft of the rotor, the electromagnet 25 is demagnetized. Since excitation and demagnetization of the electromagnet 25 are switched as described above, the transmission torque $T_0$ in the low rotational speed range can be enlarged. In the high rotational speed range, the transmission torque $T_0$ can be reduced. Thus, the conditions for obtaining the automatic aligning effect can easily be satisfied.

Figure 24:
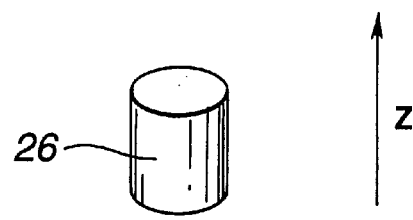
FIG. 24 is a perspective view showing another configuration (columnar shape) of the balancing member in the aforementioned rotation control apparatus.
Figure 25:
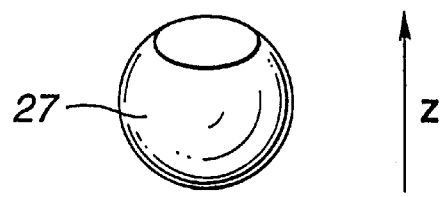
FIG. 25 is a perspective view showing still another configuration (barrel shape) of the balancing member in the aforementioned rotation control apparatus.

Each of the balancing members may be a cylindrical balancer 26 as shown in FIG. 24 or a barrel-shape balancer 27 as shown in FIG. 25. The cylindrical balancers 26 and the barrel-shape balancers 27 are disposed in such a manner that their central axes are made to be in parallel with the axial direction of the support shaft 7 (in a direction z shown in FIG. 1) after they have been accommodated in the case 4.

Figure 26:
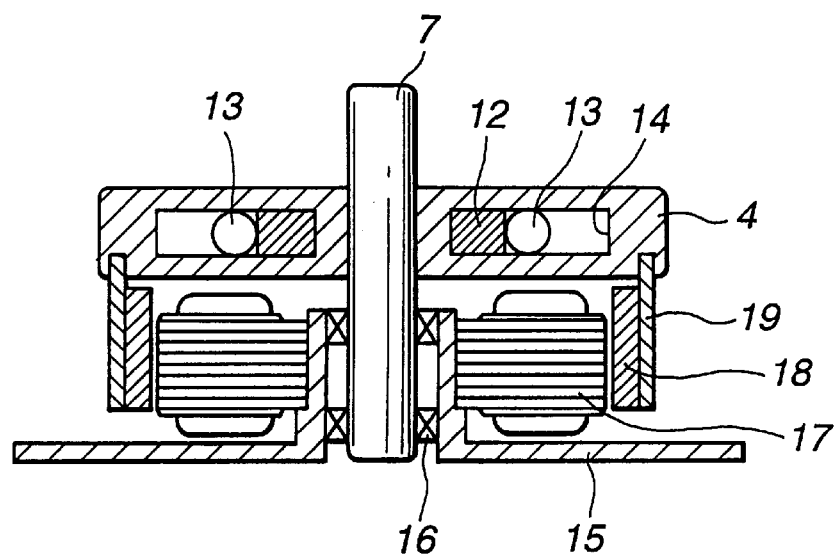
FIG. 26 is a vertical cross-sectional view showing a configuration of the essential portion of the aforementioned rotation control apparatus according to an embodiment in which the balancing member is held by a member which is made as a unitary block with the rotor of the motor.
Figure 27:
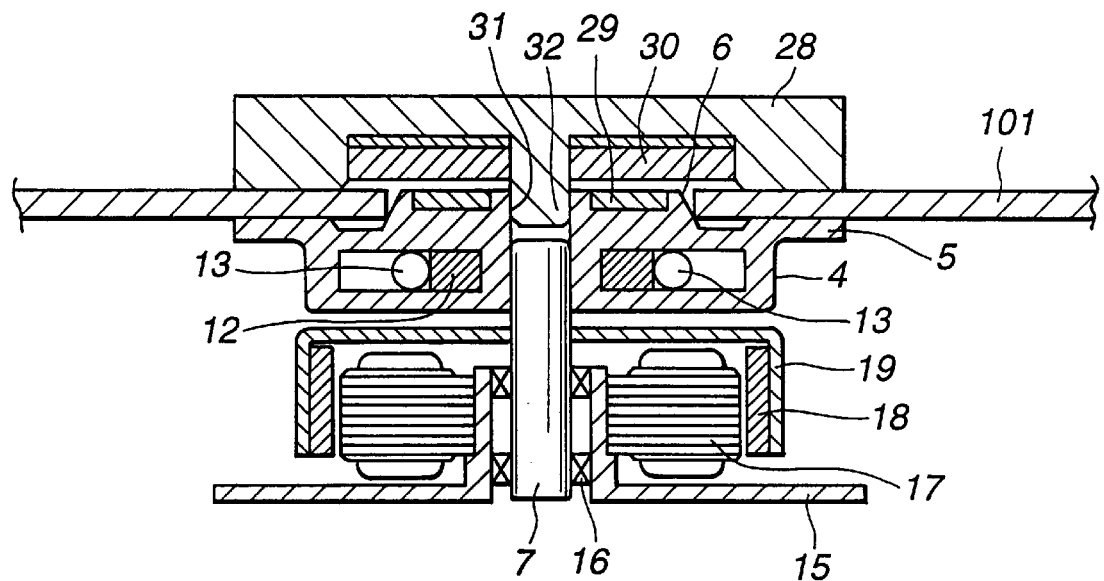
FIG. 27 is a vertical cross-sectional view showing a configuration of the essential portion of the aforementioned rotation control apparatus according to an embodiment in which the balancing member is held by a member which is made as a unitary block with the disc table.

The rotation control apparatus may have a structure where the case 4 having the space for accommodating the balancing members is formed integrally with the motor rotor 19, as shown in FIG. 26. The rotation control apparatus may have a structure where the case 4 having the space for accommodating the balancing members is included in the disc table 5, as shown in FIG. 27. A magnet 29 for attracting a chucking member 28 for chucking a recording disc 101 in cooperation with the disc table 5 is disposed in the upper portion of the locating projection 6 of the disc table 5.

Figure 28:
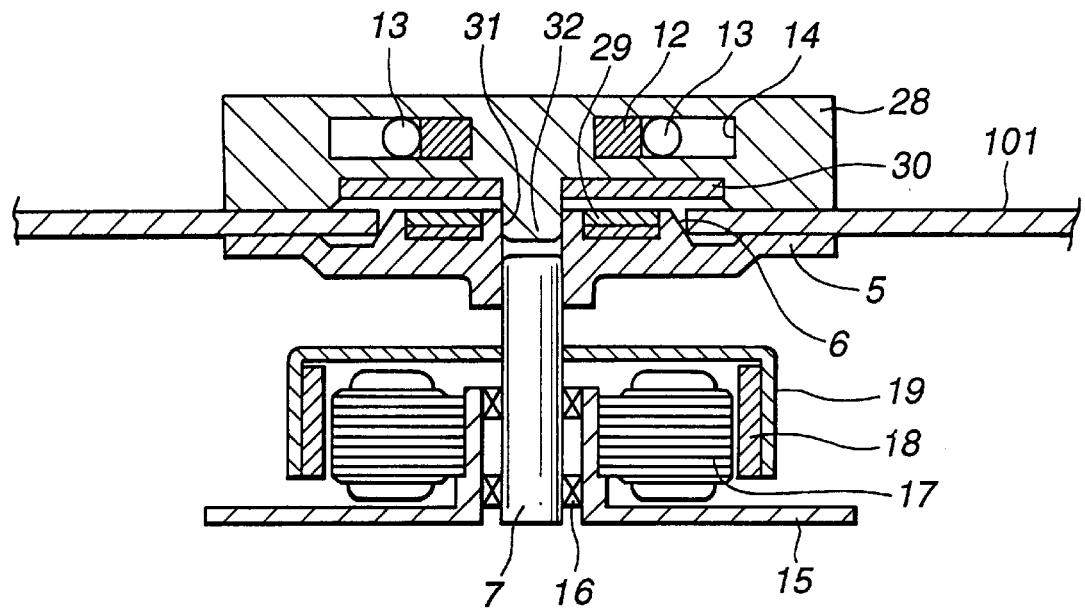
FIG. 28 is a vertical cross-sectional view showing a configuration of the essential portion of the aforementioned rotation control apparatus according to an embodiment in which the balancing member is held by a member which is made as a unitary block with the disc chucking member.

Also the chucking member 28 is provided with a magnet 30 for attracting the disc table 5. The chucking member 28 has a locating projection 32 which is received by a receiving hole 31 formed in the central portion of the upper portion of the disc table 5, the locating projection 32 being formed in the central portion of the lower portion of the chucking member 28. Also the foregoing rotation control apparatus may have a structure where the case 4 having the space for accommodating the balancing members is included in the chucking member 28, as shown in FIG. 28.

Although the structure in which the rotation drive apparatus according to the present invention is formed into a disc rotation drive apparatus has been described in the foregoing embodiment, the rotation drive apparatus according to the present invention may be formed into a structure which is provided for an industrial machine or another electric product. For example, the present invention may be applied to a lawn mower.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A rotation drive apparatus comprising:
    a composite rotor supported by a base supported by a damper in such a manner that a recording member is rotatively supported through said support shaft and a disc table which is rotated together with said recording member by a rotational member; and
    an automatic aligning mechanism having a case that is rotated by a rotating means through a support shaft and having a movable space with a circular or annular cross-sectional shape perpendicular to the axial direction of the shaft, a plurality of balancing members movably disposed in said movable space in said case, and a magnetic field generating means joined to a portion of said case, said automatic aligning mechanism being capable of automatically positioning the center of gravity of said composite rotor to a position on said rotational member during rotations of said composite rotor,
    wherein each of said balancing members starts rotating to follow said composite rotor due to a starting torque transmitted from said composite rotor to each of said balancing members because said balancing members are attracted to said magnetic field generating means at the time said composite rotor starts rotating, and
    when the rotational frequency of said composite rotor is raised to a frequency not lower than the resonant frequency of said damper in a direction of a plane perpendicular to the support shaft of said composite rotor, said balancing members move away from the magnetic field generating means due to an adjustment torque to perform an automatic aligning operation.

2. A rotation drive apparatus according to claim 1, wherein said balancing member is formed into a spherical shape.

3. A rotation drive apparatus according to claim 1, wherein a buffer member made of an elastic material is provided on the inner wall of an outer portion of said case.

4. A rotation drive apparatus according to claim 1, wherein an outer wall of said case is formed into magnetic field generating means.

5. A rotation drive apparatus according to claim 1, wherein said magnetic field generating means is a permanent magnet disposed adjacent to the center of rotation of said rotor.

6. A rotation drive apparatus according to claim 5, wherein said permanent magnet has a disc-like shape and two poles magnetized in a direction perpendicular to a main surface of said permanent magnet.

7. A rotation drive apparatus according to claim 1, wherein, assuming that a transmission torque that is transmitted from said composite rotor to said balancing member is $T_0$, an inertia moment of said balancing member is J, the acceleration of the rotational angle of said balancing member is $\beta$, and the relationship $T_1 = J\beta$ is satisfied, and assuming that the mass of said balancing member is m, the distance from the rotational shaft of said composite rotor is R and the relationship $T_2 = mR$ is established, the following relationship is satisfied when said composite rotor starts rotating:

$$T_1 + T_2 < T_0$$

and wherein, assuming a torque that acts on said balancing member is adjustment torque $T_3$ when the rotational frequency of said composite rotor is raised to a frequency not lower than the resonant frequency of said damper in a direction perpendicular to the rotational shaft of said composite rotor, the following relationship is satisfied:

$$T_0 < T_3.$$

8. A rotation drive apparatus according to claim 1, wherein said magnetic field generating means is an electromagnet that is magnetized when the rotor starts rotating and demagnetized when the rotational frequency of said rotor is raised to a frequency not lower than the resonant frequency of said damper in a direction perpendicular to the rotational shaft of said rotor.

9. A rotation drive apparatus according to claim 1, wherein said rotational member is a spindle motor, and said recording member to be rotated is a disc-shape recording medium.

10. A rotation drive apparatus according to claim 1, wherein
    the number (n) of said balancing members is made to be a value calculated by the following equation:

n=180/θ+0.5 (all digits to the right of the decimal point are discarded)

wherein θ: angle of the balancer members disposed in the outer portion, in which $\theta=2\sin^{-1}\{r/(R-r)\}$ R: radius of movable space r: radius of each balancing member.

* * * * *